(12) United States Patent
Burke et al.

(10) Patent No.: US 8,655,861 B2
(45) Date of Patent: Feb. 18, 2014

(54) QUERY METADATA ENGINE

(75) Inventors: Patrick Burke, Ottawa (CA); Stanley L. Chauvin, Gatineau (CA); David C. Cummings, Ottawa (CA); Ariel Fernandez Ortega, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 13/545,494

(22) Filed: Jul. 10, 2012

(65) Prior Publication Data

US 2013/0097114 A1    Apr. 18, 2013

Related U.S. Application Data

(63) Continuation of application No. 13/276,112, filed on Oct. 18, 2011, now Pat. No. 8,359,305.

(51) Int. Cl.
*G06F 17/30* (2006.01)

(52) U.S. Cl.
USPC ............................................ 707/706; 707/769

(58) Field of Classification Search
USPC .................................. 707/706, 769
See application file for complete search history.

(56) References Cited

U.S. PATENT DOCUMENTS

| | | |
|---|---|---|
| 6,996,556 B2 | 2/2006 | Boger et al. |
| 7,734,619 B2 | 6/2010 | Vierich et al. |
| 7,779,031 B2 | 8/2010 | Grosset et al. |
| 7,984,043 B1 | 7/2011 | Waas |
| 8,359,305 B1 * | 1/2013 | Burke et al. ................ 707/706 |
| 2006/0271505 A1 | 11/2006 | Vierich et al. |
| 2007/0061318 A1 | 3/2007 | Azizi et al. |
| 2007/0073853 A1 | 3/2007 | Azizi et al. |
| 2008/0201293 A1 | 8/2008 | Grosset et al. |
| 2009/0265324 A1 | 10/2009 | Mordvinov et al. |
| 2011/0137937 A1 | 6/2011 | Grosset et al. |

OTHER PUBLICATIONS

Notice of Allowance from U.S. Appl. No. 13/276,112 dated Sep. 4, 2012 (9 pages).
Tseng et al. "D-Tree: A Multi-Dimensional Indexing Structure for Constructing Document Warehouses", Journal of Information Science and Engineering 22, 2006, p. 819-841.
Dehne et al. "Parallel Querying of ROLAP Cubes in the Presence of Hierarchies", DOLAP '05, Nov. 4-5, 2005, ACM, pp. 89-96.

* cited by examiner

*Primary Examiner* — Cheryl Lewis
(74) *Attorney, Agent, or Firm* — Shumaker & Sieffert, P.A.

(57) ABSTRACT

In one example, a method comprises receiving, with a data access service, an input query from an enterprise software application, wherein the data access service is positioned between the enterprise software application and a multidimensional data source; parsing the input query into a parse tree; generating an abstract syntax tree based on the parse tree, the abstract syntax tree comprising input query elements and multidimensional expression query elements based on the input query; performing an evaluation of metadata comprised in the multidimensional expression query elements of the abstract syntax tree; restructuring the abstract syntax tree based on the evaluation of the metadata; executing a query based on the restructured abstract syntax tree on the multidimensional data source; and retrieving a query result set from the multidimensional data source comprising results that are responsive to the query based on the restructured abstract syntax tree.

15 Claims, 4 Drawing Sheets

QUERY METADATA ENGINE

This application is a continuation of Ser. No. 13/276,112, now U.S. Pat. No. 8,359,305, filed on Oct. 18, 2011, entitled QUERY METADATA ENGINE, the entire content of which is incorporated herein by reference.

TECHNICAL FIELD

The invention relates to the querying of data, and more particularly, to querying multidimensional and relational data in enterprise software systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Many enterprise performance management and business planning applications require a large base of users to enter data that the software then accumulates into higher level areas of responsibility in the organization. Moreover, once data has been entered, it must be retrieved to be utilized. The system may perform mathematical calculations on the data, combining data submitted by one user with data submitted by other users. Using the results of these calculations, the system may generate reports for review by higher management. Often these complex systems make use of multidimensional data sources that organize and manipulate the tremendous volume of data using data structures referred to as data cubes. Each data cube, for example, includes a plurality of hierarchical dimensions having levels and members for storing the multidimensional data.

In recent years vendors of multidimensional data sources for use in enterprise software systems have increasingly adopted the Multidimensional Expression query language ("MDX") as a platform for interfacing with the data sources. MDX is a structured query language that software applications utilize to formulate complex queries for retrieving and manipulating the data stored within the multidimensional data sources.

Reporting and analysis end user products (typically referred to as Business Intelligence, or BI, tools) allow users to author reports and perform data exploration and analysis on a myriad of data sources including, primarily, relational and multi-dimensional databases, as well as flat files, Extensible Markup Language ("XML") data, data streams, and unorganized text and data. Executing an individual report or analysis by BI tools may include parsing and planning the query and then executing the query on the underlying data source, retrieving data from the underlying data source in response to the query, and returning the data to the BI tools.

SUMMARY

In general, examples disclosed herein are directed to a query metadata engine. A query metadata engine works with the metadata of a query instead of the data. After a query planner receives a query, such as an MDX query, the query metadata engine evaluates the query to figure out context metadata of the query's MDX functions as the underlying data provider would understand the MDX query when executing with real data. The query metadata engine executes MDX queries on metadata by understanding how the MDX functions work and how the MDX queries would execute based on metadata. The query metadata engine may execute functions within a query to understand the metadata of each expression in the context of the query. The query metadata engine may also query the underlying data sources remotely to retrieve metadata and information about how their metadata is structured around their data.

The query metadata engine then returns this context metadata to the query planner, to help the query planner improve the restructuring of the query before providing the restructured query to a query execution engine to execute the query on underlying data sources, such as multi-dimensional cubes accessible for Online Analytical Processing (OLAP). The query metadata engine may also create place-holder metadata information to help facilitate the query planning and query execution. By improving or optimizing the queries based on metadata, the data access service is able to ensure that the query results will be returned in an ideal format, without having to run a query on the data itself to optimize the query results, and without having to perform additional calculations on the query results after receiving them from the underlying multidimensional data sources.

Thus, the query metadata engine executes queries locally based on metadata, gains an understanding of the MDX functions locally, and makes evaluations on how to restructure the query based on metadata instead of real data. The query metadata engine passes its evaluations to a query planner that receives a query parse tree from a query parser, and the query planner uses the evaluations produced by the query metadata engine in restructuring an abstract syntax tree based on the query parse tree. The query planner further includes the restructured abstract syntax tree, along with potentially additional elements such as post-processing rules, into a run tree for executing on the underlying data sources. The query metadata engine may collect levels that can be used in context with every value expression in a query, to know what levels will be used in a query and what members will need values, to optimize how the query execution engine caches or slices data upfront before executing a query on an underlying data source. By using metadata to structure the query, the query metadata engine can ensure that the query results will be exactly what is needed, without having to perform additional local calculations on the results retrieved by the query execution engine.

For example, according to the techniques disclosed herein, an enterprise business intelligence software system includes a data access service that provides a logical interface to a plurality of multidimensional data sources. The data access service may, for example, execute on application servers intermediate to the software applications and the underlying data sources. The data access service receives business queries from the enterprise software applications as input, and restructures the input queries in accordance with an analysis of the metadata of the queries and the underlying multidimensional data cubes, before executing the restructured queries on the cubes, thereby optimizing the query results.

In one example, a method includes receiving, with a data access service, an input query from an enterprise software application, wherein the data access service is positioned between the enterprise software application and a multidimensional data source. The method further includes parsing the input query into a parse tree. The method further includes generating an abstract syntax tree based on the parse tree, the abstract syntax tree comprising input query elements and multidimensional expression query elements based on the input query. The method further includes performing an evaluation of metadata comprised in the multidimensional expression query elements of the abstract syntax tree. The method further includes restructuring the abstract syntax tree based on the evaluation of the metadata. The method further includes executing a query based on the restructured abstract syntax tree on the multidimensional data source. The method further includes retrieving a query result set from the multidimensional data source comprising results that are responsive to the query based on the restructured abstract syntax tree.

In another embodiment, a computing system includes an enterprise software application configured for issuing a query in accordance with a query language, a multidimensional data source, and a data access service configured for executing on a computing environment between the enterprise software application and the multidimensional data source and receiving an input query from an enterprise software application. The data access service includes a query parser, configured for parsing the input query into a parse tree; a query planner, configured for generating an abstract syntax tree based on the parse tree, the abstract syntax tree comprising input query elements and multidimensional expression query elements based on the input query; a query metadata engine, configured for performing an evaluation of metadata comprised in the multidimensional expression query elements of the abstract syntax tree, and enabling the query planner to restructure the abstract syntax tree based on the evaluation of the metadata; and a query execution engine, configured for executing a query based on the restructured abstract syntax tree on the multidimensional data source, and retrieving a query result set from the multidimensional data source comprising results that are responsive to the restructured abstract syntax tree.

In another embodiment, a computer-readable storage medium includes executable instructions stored on a computer-readable storage medium, configured for causing a programmable processor to: receive, with a data access service, an input query from an enterprise software application, wherein the data access service is positioned between the enterprise software application and a multidimensional data source; parse the input query into a parse tree; generate an abstract syntax tree based on the parse tree, the abstract syntax tree comprising input query elements and multidimensional expression query elements based on the input query; perform an evaluation of metadata comprised in the multidimensional expression query elements of the abstract syntax tree; restructure the abstract syntax tree based on the evaluation of the metadata; execute a query based on the restructured abstract syntax tree on the multidimensional data source; and retrieve a query result set from the multidimensional data source comprising results that are responsive to the restructured abstract syntax tree.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
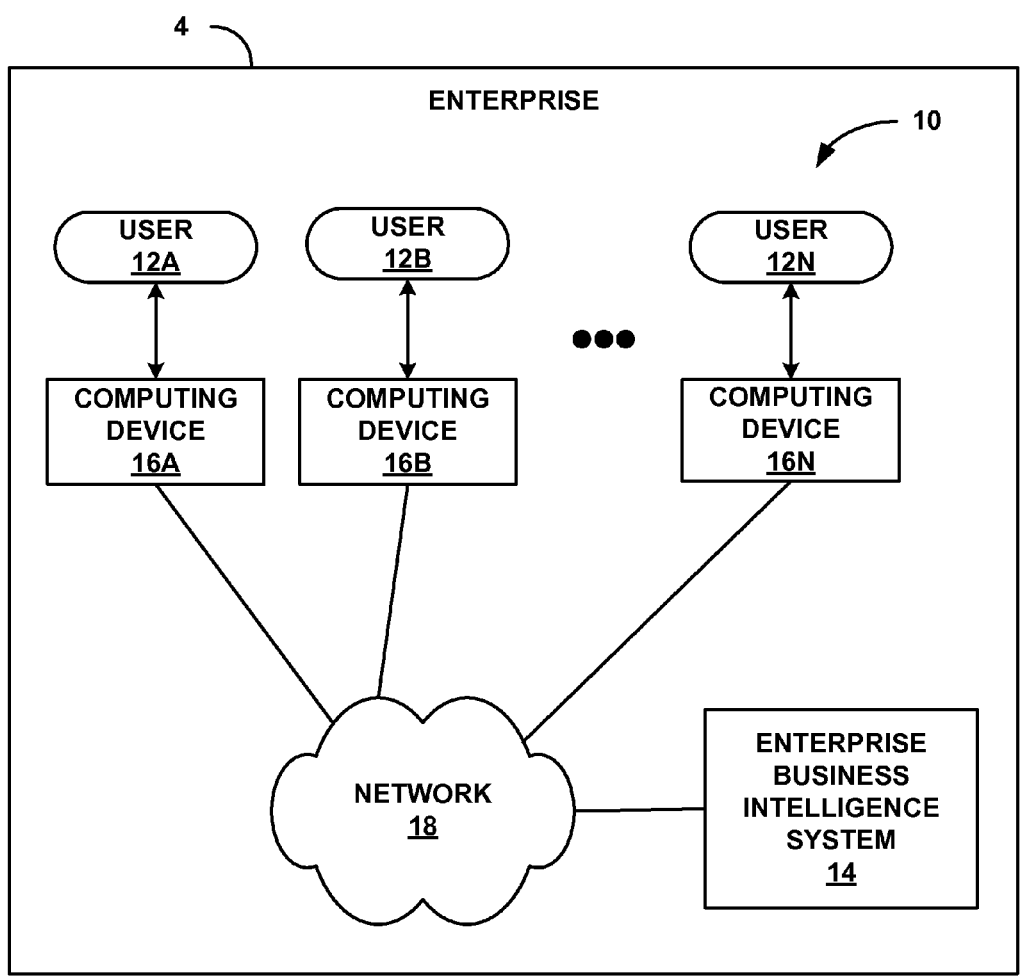
FIG. 1 is a block diagram illustrating an example enterprise having a computing environment in which a plurality of users interacts with an enterprise business intelligence system.

FIG. 1 illustrates an example context in which techniques disclosed herein may be used. FIG. 1 is a block diagram illustrating an example enterprise 4 having a computing environment 10 in which a plurality of users 12A-12N (collectively, "users 12") interact with an enterprise business intelligence system 14. In the system shown in FIG. 1, enterprise business intelligence system 14 is communicatively coupled to a number of computing devices 16A-16N (collectively, "computing devices 16") by a network 18. Users 12 interact with their respective computing devices to access enterprise business intelligence system 14.

For exemplary purposes, one example of the techniques of this disclosure is described in reference to an enterprise business intelligence system, such as an enterprise financial or budget planning system. The techniques described herein may be readily applied to other software systems, including other large-scale enterprise software systems. Examples of enterprise software systems include order management systems, inventory management systems, sales force management systems, business intelligence tools, enterprise reporting tools, project and resource management systems, and other enterprise software systems.

Typically, users 12 view and manipulate multidimensional data via their respective computing devices 16. The data is "multidimensional" in that each multidimensional data element is defined by a plurality of different object types, where each object is associated with a different dimension. Users 12 may, for example, retrieve data related to store sales by entering a name of a sales person, a store identifier, a date, a product, and a price at which the product was sold, into their respective computing devices 16.

Enterprise users 12 may use a variety of different types of computing devices 16 to interact with enterprise business intelligence system 14 via network 18. For example, an enterprise user 12 may interact with enterprise business intelligence system 14 using a laptop computer, desktop computer, or the like, running a web browser, such as Internet Explorer™ from Microsoft Corporation of Redmond, Wash. Alternatively, an enterprise user may use a smartphone, such as a phone running the Android™ operating system from Google, Inc. of Mountain View, Calif., an iPhone™ from Apple Inc. of Cupertino, Calif., or similar device, running either a web browser or a dedicated smartphone application for interacting with enterprise business intelligence system 14.

Network 18 represents any communication network, such as a packet-based digital network like a private enterprise intranet or a public network like the Internet. In this manner, computing environment 10 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

Figure 2:
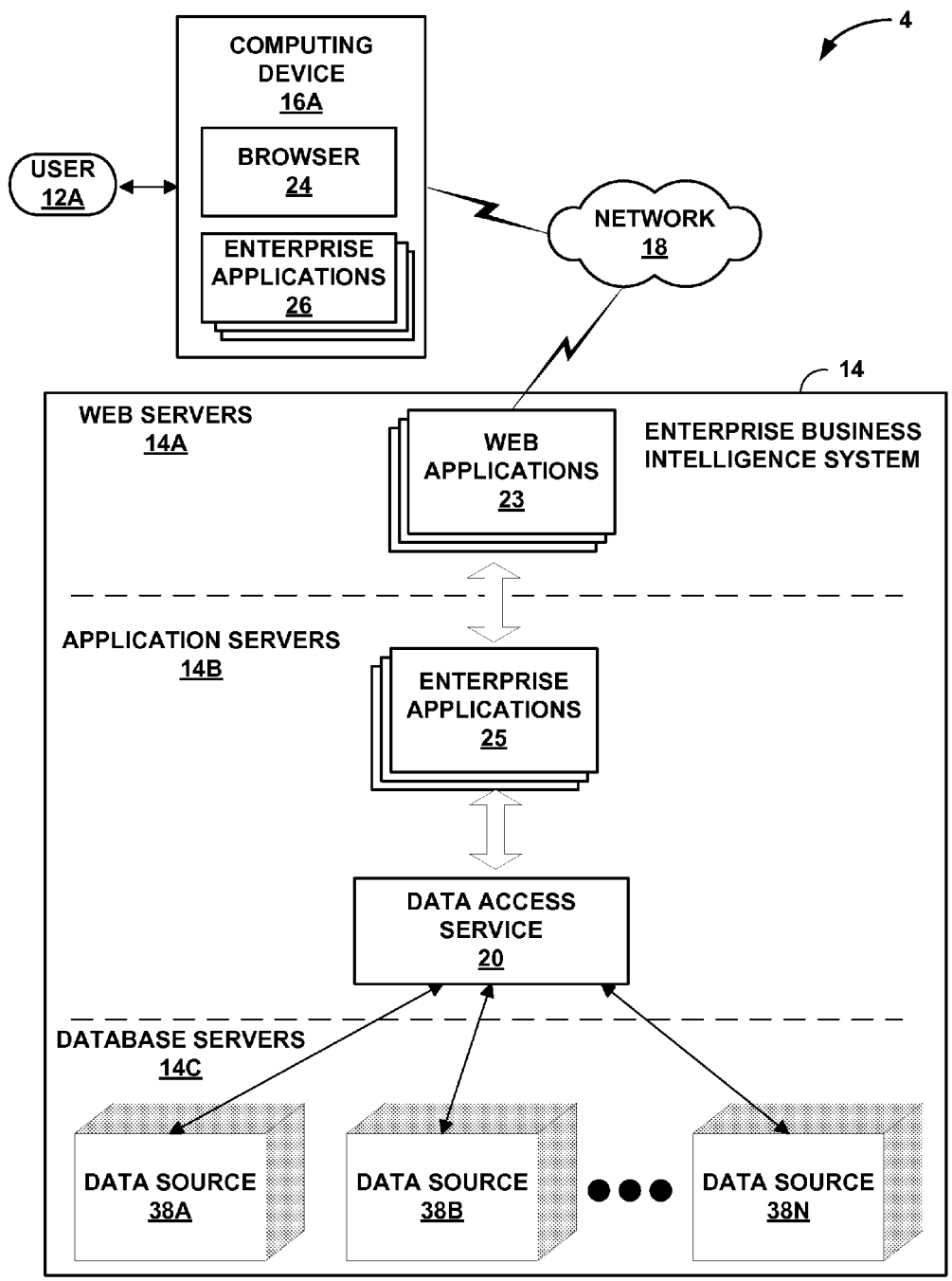
FIG. 2 is a block diagram illustrating one embodiment of an enterprise business intelligence system with a data access service.

In one example implementation, as depicted in FIG. 2, enterprise business intelligence system 14 is implemented in accordance with a three-tier architecture: (1) one or more web servers 14A that provide user interface functions; (2) one or more application servers 14B that provide an operating environment for enterprise software applications and business logic; (3) and one or more data sources 14C. The data sources 14C may include two-dimensional databases and/or multidimensional databases, i.e. cubes. The data sources may be implemented using a variety of vendor platforms, and may be distributed throughout the enterprise. As one example, the data sources 14C may be multidimensional databases configured for Online Analytical Processing (OLAP). As another example, the data sources 14C may be multidimensional databases configured to receive and execute Multidimensional Expression (MDX) queries of some arbitrary level of complexity. As yet another example, the data sources 14C may be two-dimensional relational databases configured to receive and execute SQL queries, also with an arbitrary level of complexity.

As described in further detail below, the enterprise software applications issue business queries according to a structured query language. Enterprise business intelligence system 14 includes a data access service that provides a logical interface to the data sources 14C. The data access service may, for example, execute on the application servers intermediate to the software applications and the underlying data sources 14C. The data access service permits the enterprise software applications to issue input queries to multidimensional data sources without regard to particular MDX features implemented by each of the underlying data sources. The data access service includes a query metadata engine for structuring the query in accordance with metadata. The data access service enables the underlying data sources to perform MDX functions that they support, for example, and retrieve a query result set from the underlying data sources.

FIG. 2 is a block diagram illustrating in further detail portions of one embodiment of an enterprise business intelligence system 14. In this example implementation, a single client computing device 16A is shown for purposes of example and includes a web browser 24 and one or more client-side enterprise software applications 26 that utilize and manipulate multidimensional data.

Enterprise business intelligence system 14 includes one or more web servers that provide an operating environment for web applications 23 that provide user interface functions to user 12A and computer device 16A. One or more application servers provide an operating environment for enterprise software applications 25 that implement a business logic tier for the software system. In addition, one or more database servers provide multidimensional data sources 38A-38N (collectively "data sources 38"). The multidimensional data sources may be implemented using a variety of vendor platforms, and may be distributed throughout the enterprise.

Data sources 38 may represent multidimensional data sources which store information organized in multiple dimensions, for example. Data on multidimensional data sources 38 may be represented by a "data cube," a data organization structure capable of storing data logically in multiple dimensions, potentially in excess of three dimensions. In some examples, these data sources may be databases configured for Online Analytical Processing ("OLAP"). In various examples, these data sources may be vendor-supplied multidimensional databases having MDX processing engines configured to receive and execute MDX queries.

As shown in FIG. 2, data access service 20 provides an interface to the multidimensional data sources 38. Data access service 20 exposes a consistent, rich set of MDX functions to server-side enterprise applications 25 and/or client-side enterprise applications 26 for each of multidimensional data sources 38 regardless of the specific MDX functions implemented by the particular data source as well as any vendor-specific characteristics or differences between the data sources.

That is, data access service 20 receives business queries from enterprise applications 25, 26 targeting one or more multidimensional data sources 38. User 12A, for example, may interact with enterprise applications 25, 26 to formulate a business query, which enterprise applications 25, 26 submit to data access service 20. Data access service 20 receives the input business queries and, for each input query, parses the input query into a parse tree, binds metadata references to known metadata objects, generates an abstract syntax tree based on the parse tree, evaluates multidimensional query metadata in the abstract syntax tree, and restructures the abstract syntax tree based on the metadata to optimize the query results before submitting a query based on the restructured abstract syntax tree to a query execution engine for executing on one of the multidimensional data sources. The query it submits to the query execution engine 44 includes a run tree that may include post-processing rules in addition to the restructured abstract syntax tree.

Executing an MDX query may be done from a business tool such as the Cognos 10™ business intelligence (BI) software from International Business Machines Corporation of Armonk, N.Y., for example. In this case, executing the MDX query may have the following basic flow:

Receive business query language
Parse query to create abstract syntax tree (AST)
Bind identifiers to metadata objects
Plan MDX query
Execute MDX query
Process result In this manner, data access service 20 permits the enterprise software applications 25 or 26 to issue input queries to multidimensional data sources 38, and optimizes MDX queries based on metadata before executing the queries on the underlying data sources. As a result, user 12A may interact with enterprise software applications 25, 26 to provide query specifications that utilize the full, rich features of the query language, such as MDX, and have them executed on the data sources 38 with the efficiency of queries that are optimized in accordance with the query metadata.

Figure 3:
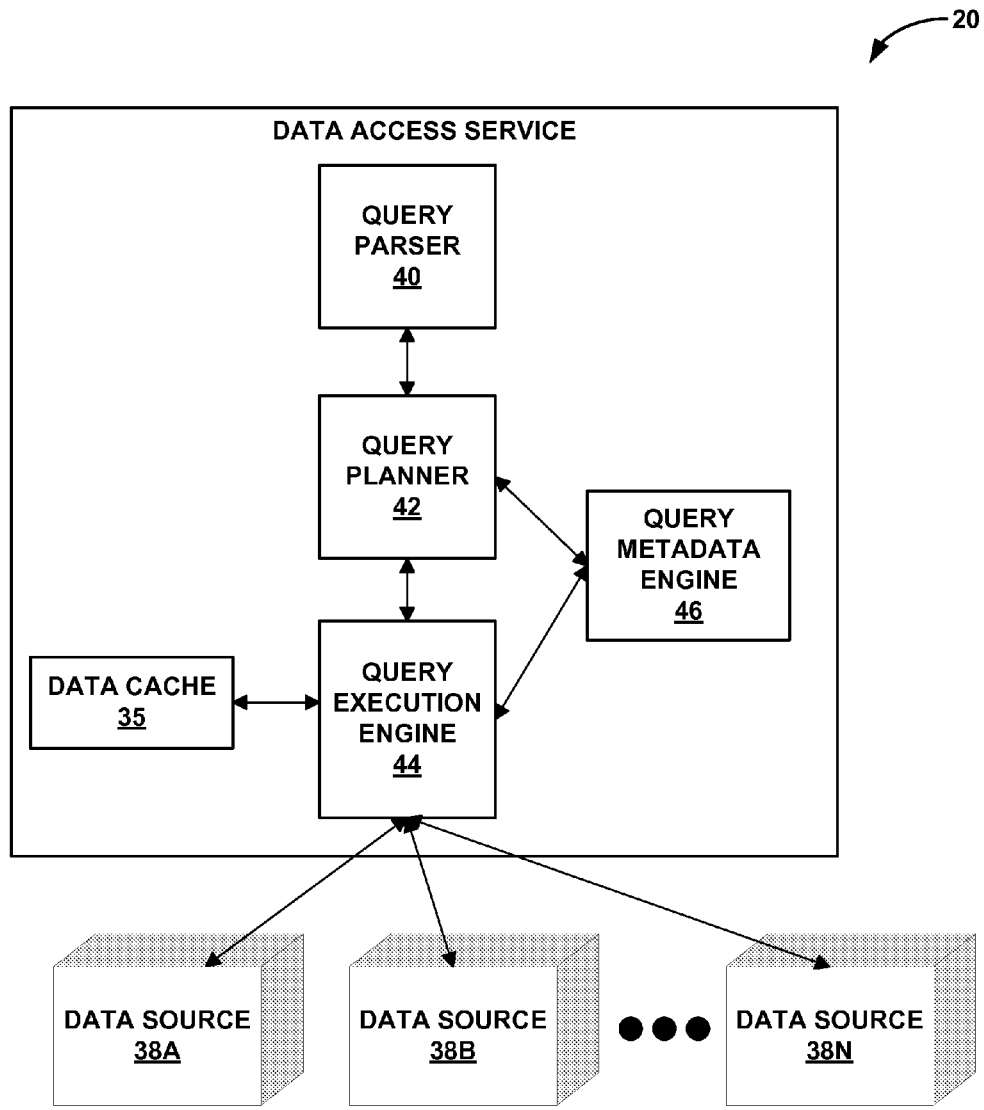
FIG. 3 illustrates in further detail an example data access service that includes a query metadata engine and provides a logical interface to a plurality of multidimensional data sources.

FIG. 3 illustrates in further detail an example embodiment of data access service 20. In this example embodiment, data access service 20 comprises query parser 40, query planner 42, query execution engine 44, data cache 35, and query metadata engine 46. Query execution engine 44 performs queries of any number of external data sources 38A-38N (data sources 38). Any of query parser 40, query planner 42, query execution engine 44, and query metadata engine 46 may be specialized for using one or more types of querying tools on a particular type of data sources, such as MDX queries of a multidimensional data cube. In various implementations, data access server 20 may provide a generic interface between computing device 16A and data sources 38. Data access server 20 may run on the server level, the application level, or as its own intermediate level.

Query parser 40 represents a parsing application within enterprise business intelligence system 14. In general, query parser 40 parses a business query received as input into constituted execution units to produce a binary representation of the query in the form of a parse tree. Each node in the parse tree represents one of the discrete query execution units and specifies the function(s) associated with the node and any required query elements.

Query planner 42 processes each node of the parse tree and identifies all known query functions and elements, i.e., those query elements that the query planner 42 recognizes with respect to the underlying data sources. Known elements may, for example, be described in query metadata engine 46, which the query planner 42 updates in real-time as it processes queries. For any unknown query element, e.g., query elements not previously seen by the query planner 42 or query metadata engine 46 and thus not specified in the query metadata engine 46, query metadata engine 46 accesses the appropriate data source 38 to retrieve metadata necessary to identify the query element. For example, query metadata engine 46 may access one of data sources 38 and determine that an unknown query element is a dimension of a data cube, a measure, a level or some other type of multidimensional object defined within the data source.

Each query element may have associated metadata indicating its status as one of the following: 1. a column in a relational table; 2. a member in a dimension; 3. a single dimension set expression; 4. a hierarchy (equates to all members of the hierarchy); 5. a level (equates to all members of the level); 6. a dimensional member property (value of the property for the associated member in the same row); 7. a measure; or 8. a set or value expression. The query elements may be contained in one or more rowsets. Each rowset is an ordered collection of one or more query elements. Query elements within a rowset may be optionally identified as grouping columns which define the aggregation of measure/value query items in the rowset. The rowsets may in turn be organized to construct the query results in a finalized format such as a report.

During the process of query planner 42 processing the nodes of the parse tree, query planner 42 may rearrange the nodes of the parse tree to change their execution order, and to remove unnecessary nodes to improve the performance of the query, such as to increase execution speed, reduce the amount of data communicated over the enterprise network by taking advantage of cached data, stored in a data cache 35, or the like. Once processed by query planner 42, the resultant binary structure is referred to as an abstract syntax tree (AST), which is a tree markup of both the business query language and the MDX query throughout the planning phase. The tree markup of the MDX query contains all functions, operators and metadata object information for all identifiers. Query metadata engine 46 assists in processing multidimensional query portions of the tree. Query metadata engine 46 performs an evaluation of metadata comprised in the multidimensional expression query elements of the abstract syntax tree, and provides these evaluations to query planner 42 for query planner 42 to use in restructuring the abstract syntax tree based on the evaluation of the metadata, producing a restructured abstract syntax tree that it provides to query execution engine 44.

Query execution engine 44 represents an execution engine application within enterprise business intelligence system 14. Query execution engine 44 receives the restructured abstract syntax tree from query planner 42 and executes the restructured abstract syntax tree on one of the multidimensional data sources 38, such as data source 38A.

Query metadata engine 46 stores metadata that is acquired during the phase of the query planner 42 binding identifiers to metadata objects, and that describes the structure of data sources 38. Query planner 42 may populate the abstract syntax tree with functions, operators, and metadata object information for identifiers from the parse tree. For instance, query metadata engine 46 may contain the names of cubes, dimensions, hierarchies, levels, members, sets, properties or other objects present within data sources 38. Query metadata engine 46 may also store information about the cardinality of dimensions and levels in data cubes stored in data sources 38. Additionally, in the case of parent-child hierarchies, which have no levels, query metadata engine 46 may create level metadata base on depth of the parent-child hierarchies. Query planner 42 may make use of query metadata engine 46 to maintain information with respect to the location and organization of multidimensional data within data sources 38. Query planner 42 may utilize the information when retrieving data as well as in making decisions with respect to the execution of nodes of the run tree. Query planner 42 may retrieve metadata from query metadata engine 46, and query metadata engine 46 may use the metadata to restructure the nodes of the abstract syntax tree, such as by rearranging nodes or removing nodes. The resulting restructured abstract syntax tree may be used for execution on the data sources 38.

Query execution engine 44 interacts with data sources 38 to issue queries and direct the data sources 38 to execute the functions associated with nodes of the restructured abstract syntax tree designated for execution. Query execution engine 44 may issue structured MDX queries to multidimensional data sources among data sources 38 according to operations defined by the nodes of the restructured abstract syntax tree. Data sources 38 remotely apply the operations on the data and return one or more result sets. Query execution engine 44 produces a query result set and provides the query result set to the requesting enterprise software applications 25, 26. The query result set is in a form that facilitates any further processing or rendering that may be done at the level of the requesting enterprise software applications 25, 26, such as performing report level operations on the query result set, or rendering the query result set in accordance with a report layout to produce a finalized report output.

Further details of the context and operation of query execution engine 44, and of particular examples of the functioning of query execution engine 44, are as follows. Query planner 42, query execution engine 44, and query metadata engine 46 are discussed below in terms of an MDX query processing service.

One of the common problems faced with creating, optimizing and debugging a Multidimensional Expression (MDX) is understanding what is providing context to a query expression and what a query expression will return. However, it may not be necessary to know the real members involved, but only level and hierarchy metadata. This is especially true for an MDX query planner 42 that automatically generates or optimizes a query on top of any MDX query execution engine 44. For example, given a FILTER function, a query planner 42 must know what levels provide context to the value expression to answer reporting questions, but going to the data provider, i.e., an underlying data source 38, imposes significant overhead. Merely using a smaller granularity of information but without trying to use actual data enables the use of query metadata engine 46 as a lightweight metadata MDX engine to facilitate the creation and understanding of an MDX statement. Query metadata engine 46 is able to execute any individual part of the MDX statement rather than only as a whole.

MDX query planner 42 may infer hierarchy and level information by understanding functions. For example, given this MDX query:

SELECT
    INTERSECT([Customers].[Country].Members, {[Customers].[All

-continued

```
        Customers].[USA].[CA],[Customers].[All
        Customers].[Canada].[BC]})
ON AXIS(0)
FROM [Sales]
```

Query planner 42 can infer the INTERSECT function returns members from the level [Customers ].[Country].Members. However, the MDX query may take a form such as the following example:

```
WITH
    MEMBER
        [Customers].[Calc] AS '
        SUM(
        FILTER(
            CROSSJOIN(
                {[Customers].[All Customers].[USA]},
                DESCENDANTS(
                    [Product].CurrentMember,
                    1)),
                ([Customers].[All Customers].[USA],
                [Measures].[Store Sales])> 0))'
SELECT
    GENERATE(
        [Product].[Product Family].MEMBERS,
        CROSSJOIN(
            {[Product].CURRENTMEMBER},
            {[Customers].[Calc]}),
        ALL)
    ON AXIS(0),
    {[Measures].[Store Sales]}
    ON AXIS(1)
FROM
    [Sales]
WHERE
    ([Time].[1997])
```

Given this MDX query, it becomes very hard for query planner 42 to infer what levels provide context to the FILTER expression and what level it returns, as they are ambiguous. However, query metadata engine 46 can return a list of levels and hierarchies that provide context to the filter by having it execute the full MDX query on the metadata, and understand where the calculated member 'Calc' is and what it intersects with. Without accurately answering this question, one problem is that query planner 42 must generate the MDX in a worst case scenario, which will perform poorly, rather than based on the exact levels that the data provider or data source 38 will see when executing the MDX.

The query metadata engine 46 works closely with query planner 42, which may also take the form of a query optimizer or query debugging tool. One of the advantages of query metadata engine 46 is enhanced performance. Query metadata engine 46 can quickly understand precisely what will happen with any part of the MDX query when the data provider or data source 38 executes the query. For example, the query metadata engine 46 may collect the exact levels that could be in context with every value expression in the query. This could be used to know not only what levels will be used in the query, but also what members will need a value. Often these are not identical and not realizing this can have large performance implications. An MDX query execution engine 44 itself could use this to optimize how it caches or slices data upfront before trying to execute a query.

The query metadata engine 46 may execute on an abstract syntax tree (AST). Using Microsoft Analysis Services (MSAS)™ from Microsoft Corporation of Redmond, Wash. as an example, the metadata information may be retrieved from the data source using the OLAP Schema Rowsets interface. The query metadata engine 46 takes the AST as input and executes the request on the specific node in the tree to either explain what is returned by the node or what is providing context to the node. Using the following MDX as an example:

```
WITH
    MEMBER
        [Geography].[B1].[CALC2] AS '
        SUM(
            CROSSJOIN(
                [Geography].[B1].[Continent B1].MEMBERS,
                [Product].[B1].[Product Line].MEMBERS))',
        SOLVE_ORDER = 2
    MEMBER
        [Measures].[CALC1] AS '
            (([Measures].[Sales Price Sum])+100)',
        SOLVE_ORDER = 1
SELECT
    {[Measures].[CALC1]}
    ON AXIS(0),
    {CROSSJOIN(
        [Geography].[B1].[Continent B1].MEMBERS,
        [Product].[B1].[Product Line].MEMBERS),
        ([Geography].[B1].[CALC2],
        [Product].[B1].DEFAULTMEMBER)}
    ON AXIS(1)
FROM
    [Automobile_C01]
```

The query metadata engine 46 can be asked to perform an evaluation of what levels provide context to the tuple value expression in CALC1. To do this, the engine will first analyze the MDX to find what combinations of metadata objects, including higher solve order calculations, provide context to the value expression. This will require the query metadata engine 46 to understand how every function will be executed by the data source.

In this example, there are two distinct combinations of metadata objects providing context to the calculation. The first includes the [Continent] and [Product Line] members from AXIS 1. The second includes the CALC2 and the Product.B1 default member from AXIS 1. Because CALC2 has a higher solve order, the query metadata engine 46 executes this combination using MDX solve order precedence to understand which members are providing context. As CALC2 resolves [Continent] and [Product Line] members, these are the metadata objects providing context from the second combination. The union of the two combinations are used to determine what is in context for the value expression.

The end result is that query metadata engine 46 returns [Continent] and [Product Line] as the levels providing context to the tuple value expression in CALC2. This is a recursive process of determining what provides contexts and executing functions and calculations. For example, if CALC2 references another calculation that would provide context, this same process must be done to find what provides context to the previous iteration. The query metadata engine 46 can also perform evaluations of general questions on the AST, such as what metadata objects are providing context to all value expressions.

Following are two examples for where the query metadata engine 46 works together with the query planner 42 and improves performance.

Referring again to the basic flow of an MDX query as provided above, the query metadata engine 46 may be plugged into the Plan MDX query phase, performed by query planner 42, to help with the last three steps and operate on top of the AST. The query metadata engine 46, which either may be an MDX metadata engine or comprise an MDX metadata engine in this example, is able to work on the MDX portions of the AST, which would include the complete and final MDX query that is generated at the end of the Plan MDX phase.

One example use case, involving optimizing an MDX query, is as follows.

Given a query language that asks for the top three products on one edge and years on another edge with summaries on both, the following MDX query may be created:

```
WITH
    MEMBER
        [Time YM].[CALC1] AS
        AGGREGATE([Time YM].[Calendar Year].MEMBERS),
        SOLVE_ORDER = 2
    MEMBER
        [Product].[B1].[CALC2] AS
        AGGREGATE(TOPCOUNT(
            [Product].[B1].[Product Line].MEMBERS,
            3,
            ([Measures].[Sales Price Sum],
                [Calendar Month].DEFAULTMEMBER))),
        SOLVE_ORDER = 1
SELECT
    {[Time YM].[Calendar Year].MEMBERS,
        [Time YM].[CALC1]}
    ON AXIS(0),
    {TOPCOUNT(
        [Product].[B1].[Product Line].MEMBERS,
        3,
        ([Measures].[Sales Price Sum],
            [Calendar Month].DEFAULTMEMBER)),
        [Product].[B1].[CALC2]}
    ON AXIS(1),
    {[Measures].[Sales Price Sum]}
    ON AXIS(2)
FROM
    [Automobile_C01]
```

If this MDX query were to be pushed to the data provider or data source 38, such as SQL Server Analysis Services (SSAS)™ available from Microsoft Corporation of Redmond, Wash., in this example, the TOPCOUNT expression would be evaluated 25 times. This includes 24 times for each year, plus once on the edge. However, the context never changes within the value expression of the TOPCOUNT so the result of the TOPCOUNT will always be the same, and the evaluations will be repetitive and impose significant overhead.

To prevent the MDX query execution engine 44 from doing this, the MDX Metadata Engine will be used within the Planning phase. The AST representing this MDX query will be passed to the query metadata engine 46 and the query planner 42 will ask both TOPCOUNT expressions what hierarchies are providing context to the TOPCOUNT function. It will return an empty list as all hierarchies within this query are fully resolved within the TOPCOUNT function. This means context will never change and a query named set can be created to ensure the provider will only execute the TOP-COUNT once and re-use the result every time it's seen.

The final MDX query sent to the provider would be the following:

```
WITH
    SET MYSET AS
        TOPCOUNT(
            [Product].[B1].[Product Line].MEMBERS,
            3,
            ([Measures].[Sales Price Sum],
                [Calendar Month].DEFAULTMEMBER))
    MEMBER
        [Time YM].[CALC1] AS
        AGGREGATE([Time YM].[Calendar Year].MEMBERS),
        SOLVE_ORDER = 2
    MEMBER
        [Product].[B1].[CALC2] AS
        AGGREGATE(MYSET),
        SOLVE_ORDER = 1
SELECT
    {[Time YM].[Calendar Year].MEMBERS,
        [Time YM].[CALC1]}
    ON AXIS(0),
    {MYSET,
        [Product].[B1].[CALC2]}
    ON AXIS(1),
    {[Measures].[Sales Price Sum]}
    ON AXIS(2)
FROM
    [Automobile_C01]
```

Another example use case, involving aiding result processing, is as follows.

An input query with business query language often does not translate to an MDX query in a straightforward nature. For example, a user might want to nest both the countries and cities next to each other to show grouping in the report. However, MDX will only allow one member from each hierarchy in each row or column.

To counteract this, the Plan MDX phase allows the Process result phase to know what it receives and how it maps to the original business query. One way to try to solve this would be by asking for all members in a flat list and inject tags in the MDX. The tags would be used to signal the result processing where the member fits in the original business query. One side effect is this prevents the MDX NON EMPTY keyword from working, since the tags have a non-null value to ensure they are always in the result.

A different way to solve this, making use of the query metadata engine 46, generates the example MDX query as follows. In this example, Product Code members cannot be suppressed by the MDX query execution engine using the NON EMPTY keyword due to their tags:

```
WITH
    MEMBER
    [Geography].[B1].[COUNTRY_TAG] AS '1',
    SOLVE_ORDER = 65535
    MEMBER
    [Geography].[B1].[CITY_TAG] AS '1',
    SOLVE_ORDER = 65535
SELECT
    NON EMPTY
    {[Product].[B1].[Product Code].MEMBERS}
    ON AXIS(0),
    GENERATE(
        {[Geography].[B1].[Country B1].MEMBERS},
            UNION(
                UNION(
                    UNION(
                        {([Geography].[B1].[COUNTRY_TAG])},
                            {([Geography].[B1].CURRENTMEMBER)},
                        ALL),
                    {([Geography].[B1].[CITY_TAG])}, ALL),
                DESCENDANTS(
                    [Geography].[B1].CURRENTMEMBER,
                    [Geography].[B1].[City B1])), ALL)
    ON AXIS(1),
    {[Measures].[Sales Price Sum]}
    ON AXIS(2)
```

-continued

```
FROM
    [Automobile_C01]
```

Using the query metadata engine 46, the process avoids using tags by determining what levels will be in the result and where the members map to the business query based on the unique level information. One novel aspect of this example is using the MDX query metadata engine 46 to understand the MDX query in a precise manner without executing any portion of the MDX query.

The MDX query metadata engine 46 generates a new MDX query as follows, where Product Code members can be suppressed by the MDX query execution engine using the NON EMPTY keyword, and the GENERATE function is no longer required:

```
SELECT
    NON EMPTY
        [Product].[B1].[Product Code].MEMBERS
        ON AXIS(0),
    HIERARCHIZE(
        {[Geography].[B1].[Country B1].MEMBERS,
            [Geography].[B1].[City B1].MEMBERS})
        ON AXIS(1),
    {[Measures].[Sales Price Sum]}
        ON AXIS(2)
FROM
    [Automobile_C01]
```

Figure 4:
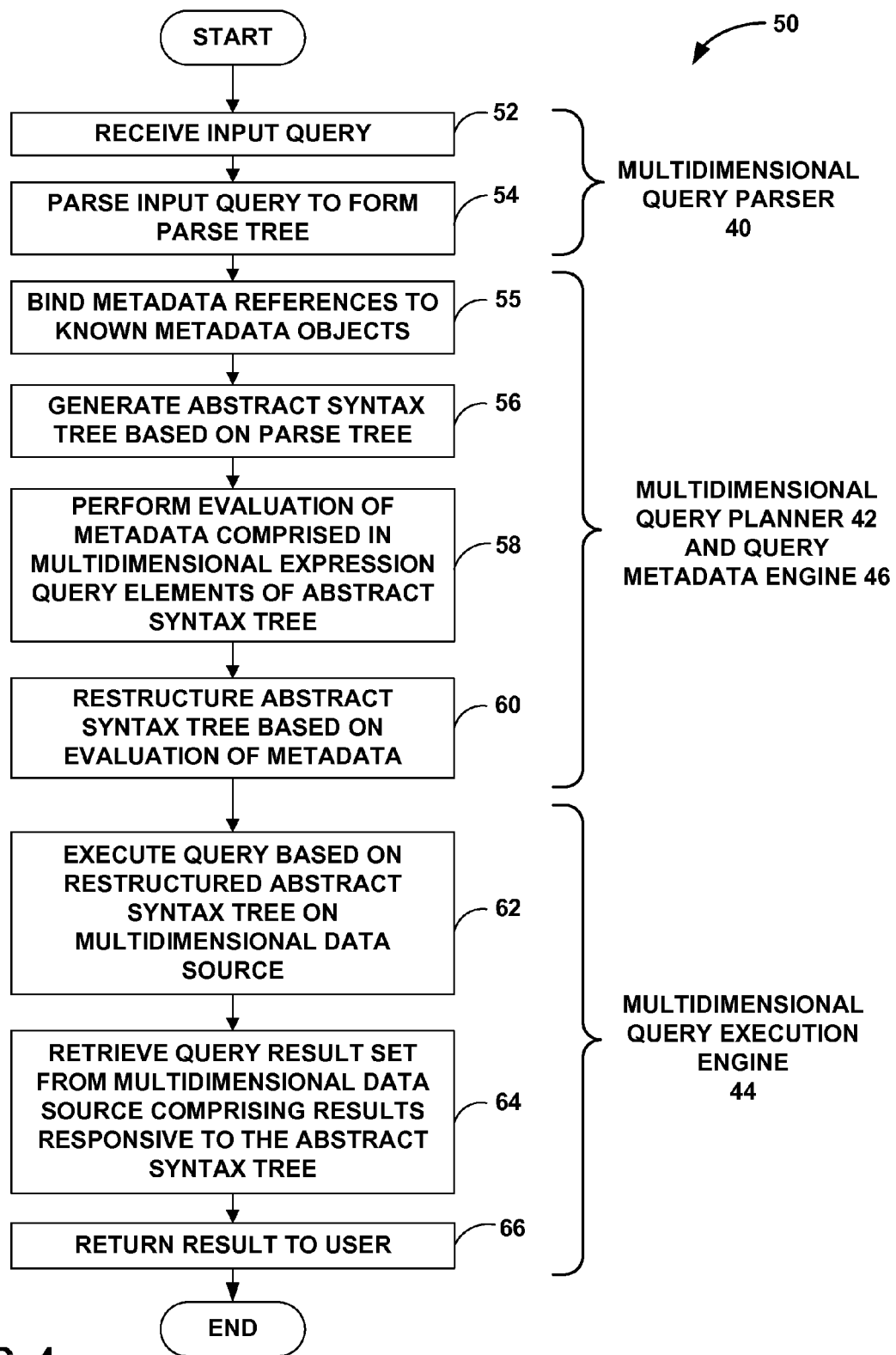
FIG. 4 is a flowchart illustrating example operation of a data access service when processing a query of a multidimensional database.

FIG. 4 is a flowchart illustrating an example process 50 of data access service 20 when processing a query directed to multidimensional data sources 38. Although described in reference to enterprise business intelligence system 14 of FIG. 2, the principles of the invention should not be limited to the described embodiments and may be applied to any system capable of storing multidimensional data in a data source.

Initially, user 12A interacts with enterprise software applications 25, 26 to build a report and, in so doing, defines a query specification for multidimensional data. This query specification may define ranges or slices of target data cubes as well as data manipulation operations to perform on the data cubes. In response, enterprise software applications 25, 26 construct and issue one or more business queries for multidimensional data sources 38. Computing device 16A may transmit this query request through network 18 to data access service 20. Data access service 20 intercepts or receives the query, e.g., by way of an API presented to enterprise applications 25, 26. (52).

Multidimensional query parser 40 parses the query into a parse tree as explained above (54). The resulting parse tree may be a binary tree structure of hierarchical nodes, each node representing an execution unit in the form of a potentially more simple multidimensional query, query element(s) and/or data manipulation function(s).

Next, multidimensional query planner 42 receives the parse tree from multidimensional query parser 40 and analyzes the nodes of the parse tree to identify references to known metadata objects. For example, multidimensional query planner 42 may identify references to levels, dimensions, cubes, hierarchies, members, sets, or properties and determine whether the referenced objects correspond to metadata within query metadata engine 46. For any unknown query element, query metadata engine 46 accesses the appropriate data source 38 to retrieve information necessary to identify the query element. Query metadata engine 46 updates itself to record the identified element.

As multidimensional query planner 42 finds known metadata references, it binds the metadata object to the parse tree at the corresponding node in the parse tree making the reference (55). In this way, query planner 42 links metadata to a given node of the parse tree for each of the query elements required for execution of the multidimensional operations specified by the node. Multidimensional query planner 42 may also analyze the parse tree to rearrange nodes, split a node into multiple nodes, or even remove nodes or branches to improve execution of the nodes. As a result of these processes, multidimensional query planner 42 thereby produces an abstract syntax tree (AST) (56). An AST may maintain the form of a binary tree and, in general, may be viewed as a hierarchical arrangement of nodes. Like the parse tree, each node represents an execution unit and may specify simplified multidimensional queries and query elements necessary to accomplish one or more data manipulation functions.

Next, query metadata engine 46 performs an evaluation of metadata comprised in multidimensional expression query elements of the abstract syntax tree (58). Query metadata engine 46 provides the resulting evaluation to query planner 42, which updates the nodes to record its decisions, including by rearranging or removing nodes, for example. For example, query planner 42 may remove nodes from the run tree that it determines, based on the metadata evaluation by query metadata engine 46, that it need not evaluate. Query planner 42 thereby restructures the abstract syntax tree based on the evaluation of the metadata by query metadata engine 46 (60).

Multidimensional query planner 42 may then pass the restructured abstract syntax tree to multidimensional query execution engine 44. Multidimensional query execution engine 44 executes a query based on the restructured abstract syntax tree on the multidimensional data source (62). Multidimensional query execution engine 44 then retrieves a query result set from the multidimensional data source comprising results that are responsive to the restructured abstract syntax tree (64). Multidimensional query execution engine 44 may also apply post-processing nodes that refer to post-processing rules to the query result set, to structure the query result set for a business report format, for example. Data access service 20 may then return this result set to software applications 25, 26 for presenting to user 12A through network 18 and computing device 16A (66).

The techniques described herein make reference to the MDX query language and SQL query language, as MDX and SQL are currently the most prominent multidimensional data query language and relational database query language, respectively. However, the techniques described herein may be applied to other structured languages capable of querying any type of data structures. The examples used herein reference MDX and SQL but should not be understood to limit the application of the invention to MDX and SQL, as the techniques may be applied to any data querying language or tool, and any type of query result set.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable storage medium may be transmitted using any appropriate signal medium, including but not limited to wireless, wireline, optical fiber cable, RF, etc., or any suitable combination of the foregoing. Computer program code for carrying out operations for aspects of the present disclosure may be written in any combination of one or more programming languages, including an object-oriented programming language such as Java, Smalltalk, C++ or the like and conventional procedural programming languages, such as C, a multi-paradigm language such as Python, Ruby, or Clojure, or any other language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in a different order, depending upon the functionality involved. Each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The description of the present disclosure has been presented for purposes of illustration and description, and is not intended to be exhaustive or limited to the disclosure in the form disclosed. Many modifications and variations will be understood by those of ordinary skill in the art based on the concepts disclosed herein. The particular examples described were chosen and disclosed in order to explain the principles of the disclosure and example practical applications, and to enable others of ordinary skill in the art to understand the disclosure for various embodiments with various modifications as are suited to the particular use contemplated. The various examples described herein and other embodiments are within the scope of the following claims.

The invention claimed is:

1. A method, comprising:
    receiving, with a data access service, an input query from an enterprise software application, wherein the data access service is positioned between the enterprise software application and a multidimensional data source;
    parsing the input query into a parse tree;
    generating an abstract syntax tree based on the parse tree, the abstract syntax tree comprising input query elements and multidimensional expression query elements based on the input query;
    performing an evaluation of metadata comprised in the multidimensional expression query elements of the abstract syntax tree;
    restructuring the abstract syntax tree based on the evaluation of the metadata;
    executing a query based on the restructured abstract syntax tree on the multidimensional data source; and
    retrieving a query result set from the multidimensional data source comprising results that are responsive to the restructured abstract syntax tree.

2. The method of claim 1, wherein generating the abstract syntax tree based on the parse tree comprises populating the abstract syntax tree with functions, operators, and metadata object information for identifiers from the parse tree.

3. The method of claim 1, wherein performing the evaluation of metadata comprised in the multidimensional expression query elements of the abstract syntax tree comprises retrieving metadata information from the multidimensional data source using an OLAP schema rowset interface.

4. The method of claim 1, wherein performing the evaluation of metadata comprised in the multidimensional expression query elements of the abstract syntax tree comprises executing a request on a node of the abstract syntax tree and evaluating what is returned by the node.

5. The method of claim 1, wherein performing the evaluation of metadata comprised in the multidimensional expression query elements of the abstract syntax tree comprises executing a request on a node of the abstract syntax tree and evaluating what provides context to the node.

6. The method of claim 1, wherein performing the evaluation of metadata comprised in the multidimensional expression query elements of the abstract syntax tree comprises evaluating an order of solve order equations that provide context to value expressions in the abstract syntax tree.

7. The method of claim 1, wherein performing the evaluation of metadata comprised in the multidimensional expression query elements of the abstract syntax tree comprises evaluating one or more expressions in the abstract syntax tree to determine what hierarchies provide context to one or more functions that correspond to the one or more expressions.

8. The method of claim 1, wherein performing the evaluation of metadata comprised in the multidimensional expression query elements of the abstract syntax tree comprises executing a multidimensional expression query on the metadata comprised in the multidimensional expression query elements of the abstract syntax tree, and thereby evaluating metadata that provides context to functions specified by the input query.

9. The method of claim 1, wherein performing the evaluation of metadata comprised in the multidimensional expression query elements of the abstract syntax tree comprises collecting levels that are in context with each of one or more value expressions in the input query.

10. The method of claim 1, wherein restructuring the abstract syntax tree based on the evaluation of the metadata comprises evaluating what members in the input query will need a value in the query result set.

11. The method of claim 1, wherein performing the evaluation of metadata comprised in the multidimensional expression query elements of the abstract syntax tree comprises determining what levels will be in the query result set.

12. The method of claim 11, wherein restructuring the abstract syntax tree based on the evaluation of the metadata comprises mapping members in the input query to the levels in the query result set.

13. The method of claim 1, further comprising performing post-processing operations on the query result set.

14. The method of claim 1, further comprising rendering the query result set in accordance with a report layout to produce a finalized report output.

15. The method of claim 1, wherein the input query conforms to Multidimensional Expression query language (MDX).

* * * * *